June 19, 1956  S. J. MARCUS  2,750,887
MOTOR MECHANISM FOR MISSILES
Filed Jan. 31, 1952
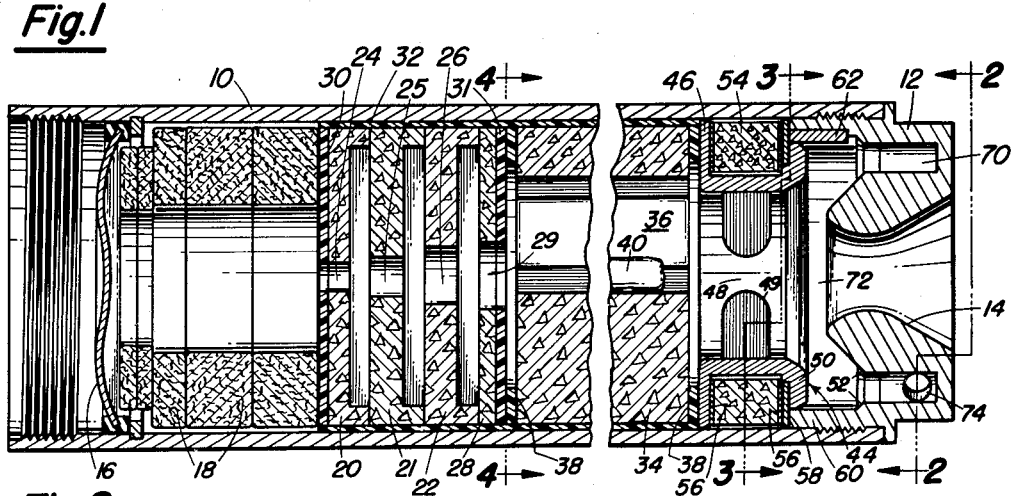
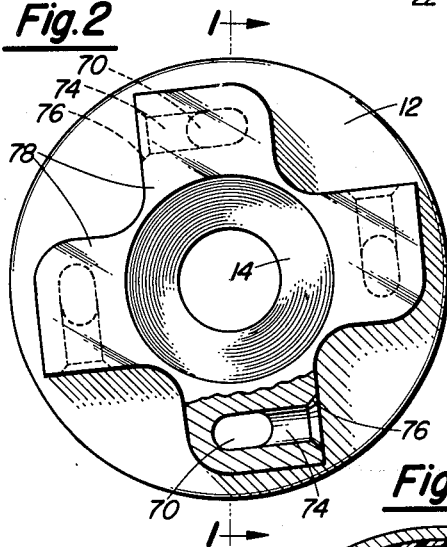
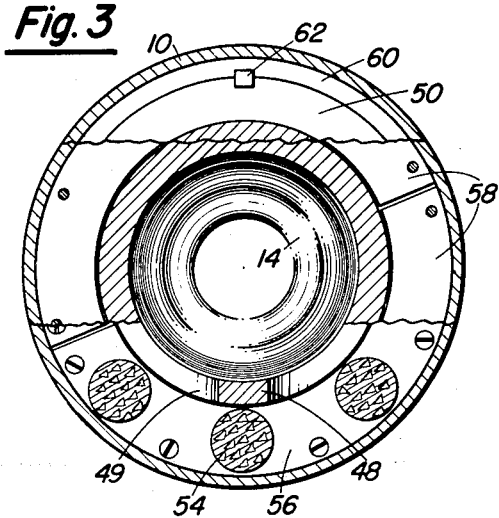
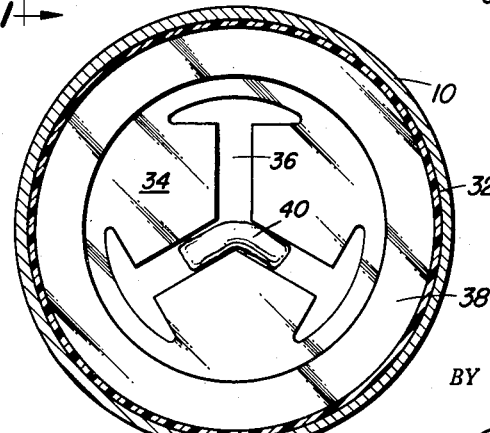
INVENTOR.
Stanley J. Marcus
BY
Attorneys

United States Patent Office 2,750,887
Patented June 19, 1956

2,750,887

MOTOR MECHANISM FOR MISSILES

Stanley J. Marcus, China Lake, Calif.

Application January 31, 1952, Serial No. 269,318

4 Claims. (Cl. 102—49)

(Granted under Title 35, U. S. Code (1952), sec. 266)

The invention described herein may be manufactured and used by or for the Government of the United States of America for governmental purposes without the payment of any royalties thereon or therefor.

This invention relates to a self-propelled missile of the jet or rocket type, and more particularly to motor mechanism for such missile operative to generate a propellent thrust and also to generate a torque to cause the missile to spin.

The invention aims to produce a high spin velocity in the missile shortly after ignition of the propellent charge, while forward acceleration proceeds normally throughout the burning period.

A feature of the invention is a provision of a rocket having an axial nozzle, and a plurality of tangential nozzles supplied with propellent gases from the same source of energy that supplies the axial nozzle, with means for automatically cutting off the supply of gases to be tangential nozzles after a predetermined quantity of propellant has been consumed, thus making all of the remaining energy of the propellent charge available for forward propulsion.

An object of the invention is to provide a high initial spin in a spin-stabilized rocket powered missile.

A further object is to provide a rocket wherein the generation of axial thrust is coordinated with the generation of torque in such a manner as to produce maximum stability of the missile and avoid excessive pressures in the combustion chamber.

Other objects and many of the attendant advantages of this invention will be readily appreciated as the same becomes better understood by reference to the following description.

Fig. 1 is a view in longitudinal section of a motor mechanism embodying the invention;

Fig. 2 is a sectional view taken on the line 2—2 of Fig. 1;

Fig. 3 is a sectional view taken on the line 3—3 of Fig. 1; and

Fig. 4 is a sectional view taken on the line 4—4 of Fig. 1.

The apparatus shown in the drawing is the after portion of a rocket, including a cylindrical motor tube 10 provided at its rear end with a nozzle member 12, having an orifice 14 in venturi form for discharge of propellent gases.

The forward end of tube 10 is sealed by means of a sealing disk 16 of usual construction, behind which may be located a plurality of annular felt pads 18 which serve to occupy any space in the tube not occupied by the propellent charge. To the rear of pads 18 are a series of cup-shaped grains 20, 21, 22 of solid propellant, which in effect form an internal burning cylinder with several internal coaxial walls. These grains are provided with axial apertures 24, 25, 26 of increasing diameter from front to rear, with a disk 28 of solid propellant having a correspondingly larger aperture 29 completing the series.

Partitions 30, 31 may be placed at the ends of the grains of solid propellant just described, with a cylindrical liner 32 connecting the two.

To the rear of partition 31 is the main grain 34 of solid propellant, of generally cylindrical form, and having an axial burning bore 36 of known shape formed therein as shown in Fig. 4. At the ends of grain 34 are inhibitor rings 38, to confine combustion mainly to the bore 36. An igniter 40 is located within bore 36, to be initiated by means of an electrical current supplied through wires, not shown.

Slidably mounted at the rear of grain 34 is a valve member or grid 44 having a forward flange 46, a cylindrical wall 48 provided with radial apertures 49, and a rear flange 50 which is designed to seat against an annular surface 52 formed on the forward portion of nozzle 12. Between flanges 46 and 50 are mounted a plurality of cylindrical spacer blocks 54, formed of solid propellant of the same composition as grain 34 and having inhibitor disks 56 protecting their ends. The blocks 54 with their inhibitor disks are seated against a locating plate 58 which is formed in two separable sections to permit it to be inserted in place. The plate 58 in turn seats against a cylindrical flange 60 formed as a forward extension of the nozzle member 12. The grid 44 is held against rotation by a key 62. It will be seen that blocks 54 prevent rearward movement of the grid 44, but that when these blocks are consumed in the operation of the rocket, grid 44 will be moved rearwardly by the pressure of gases in the combustion chamber and flange 50 will seat against surfaces 52 to prevent passage of gases therepast.

The nozzle member 12 is formed with a plurality of passages 70 which lead rearwardly from the annular chamber 72, between flange 50 and surfaces 52, and connect with tangential passages 74 discharging to atmosphere at outlets 76. To save weight, these passages may be formed in bosses 78. The annular chamber 72 functions as a manifold for the passages 70.

Operation

With the parts in the positions shown in the drawing, igniter 40 is actuated, initiating the combustion of grains 34, 20, 21, and 22. The combustion gases pass through aperture 14 to accelerate the missile in usual manner, and also pass through the chamber 72 and through passages 70 and 74 to set up a spinning torque which brings the missile to the desired rotational speed well before the propellant is consumed. Meanwhile, the blocks 54 have been ignited and are burning at their cylindrical surfaces, but they nevertheless act to prevent rearward movement of the grid 44 until they are so nearly consumed that they collapse, whereupon member 44 moves under the influence of inertia and of the pressure of gases in the combustion chamber, to its seat in contact with the surfaces 52, obturating passages 70 and terminating the torque-generating process. The entire output of gas from the combustion chamber thereafter passes through nozzles 12, and is thus available for the generation of thrust. The temperature and pressure within the combustion chamber affects the rate of combustion, but affects the blocks and the charge of propellant equally, so that the ratio between the duration of spin acceleration and the duration of the thrust acceleration is constant, with the result that the spin rate obtained is substantially constant also.

The volume and shape of the respective elements formed of solid propellant are coordinated to produce an approximately constant thrust during a predetermined period of time, with a high torque generation during the first part of said period, decreasing to zero when the desired spin rate has been attained, substantially earlier than the completion of burning of the propellant. Since the cross-sectional area available for discharge of gases decreases when the grid 44 closes, the propellent charge is so designed as to compensate for this change; in other words, the propellent charge is designed to evolve gases at a predetermined high rate during the early part of its combustion, and at a lower rate during the later part of the combustion, after the grid has closed. For this reason, the grains 20, 21, 22, and 28 are added to the usual grain 34, to produce a relatively quick burning charge which will maintain the internal pressure for a short time, and will be substantially consumed by the time the grid closes.

Obviously many modifications and variations of the present invention are possible in the light of the above teachings. It is therefore to be understood that within the scope of the appended claims the invention may be practiced otherwise than as specifically described.

What is claimed is:

1. A self-propelled missile comprising an elongated body forming a combustion chamber, an axial nozzle for discharge of gases from the combustion chamber, a plurality of tangential orifices for discharge of gases from the combustion chamber, a valve member for obturating said orifices, a manifold at the rear of said combustion chamber communicating with said orifices and forming a seat for said valve member, a stop member formed of solid propellant and exposed to gases generated in the combustion chamber preventing movement of said valve to closed position, and a propellent charge in said combustion chamber comprising a relatively slowly burning grain and a relatively rapidly burning grain, the latter being designed to be consumed approximately simultaneously with said stop member.

2. A self-propelled missile comprising an elongated body forming a combustion chamber, an axial nozzle for discharge of gases from the combustion chamber, a plurality of tangential orifices for discharge of gases from the combustion chamber, a valve member for obturating said orifices, a stop member formed of solid propellant and exposed to gases generated in the combustion chamber preventing movement of said valve to closed position, and a propellent charge in said combustion chamber formed of a relatively slow burning grain and a relatively fast burning grain, the latter being designed to be consumed at about the time said stop member is consumed.

3. A self-propelled missile comprising an elongated body forming a combustion chamber, an axial nozzle for discharge of gases from the combustion chamber, a plurality of tangential orifices for discharge of gases from the combustion chamber, a valve member for obturating said orifices, a manifold at the rear end of said combustion chamber communicating with said orifices and forming a seat for said valve member, and a stop member formed of solid propellant and exposed to gases generated in the combustion chamber preventing movement of said valve to closed position.

4. A reaction motor for missiles or the like, comprising an elongated combustion chamber, a rearwardly directed nozzle for discharge of gases from the combustion chamber to generate a longitudinal thrust, a tangential passage for discharge of gases from the combustion chamber to generate torque, a valve in said passage movable to closed position by pressure of gases in said combustion chamber, a stop member formed of solid propellant in communication with said combustion chamber and preventing closure of said valve, a propellent charge in said combustion chamber formed of a relatively slow burning propellant and a relatively fast burning propellant, the latter being constructed and arranged to be consumed at about the time said stop member is consumed, and means for initiating combustion in said combustion chamber.

References Cited in the file of this patent

UNITED STATES PATENTS

| 1,102,653 | Goddard | July 7, 1914 |
| 2,489,953 | Burney | Nov. 29, 1949 |
| 2,504,648 | Chandler | Apr. 18, 1950 |

FOREIGN PATENTS

| 659,758 | Great Britain | Oct. 24, 1951 |